United States Patent
Takahashi et al.

(10) Patent No.: US 12,439,274 B2
(45) Date of Patent: Oct. 7, 2025

(54) USER EQUIPMENT, BASE STATION APPARATUS AND COMMUNICATION METHOD

(71) Applicant: NTT DOCOMO, INC., Tokyo (JP)

(72) Inventors: Hideaki Takahashi, Tokyo (JP); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 318 days.

(21) Appl. No.: 17/633,384

(22) PCT Filed: Aug. 14, 2019

(86) PCT No.: PCT/JP2019/031914
§ 371 (c)(1),
(2) Date: Feb. 7, 2022

(87) PCT Pub. No.: WO2021/029023
PCT Pub. Date: Feb. 18, 2021

(65) Prior Publication Data
US 2022/0295298 A1    Sep. 15, 2022

(51) Int. Cl.
*H04W 16/28* (2009.01)
*H04W 72/12* (2023.01)
(Continued)

(52) U.S. Cl.
CPC ....... *H04W 16/28* (2013.01); *H04W 72/1273* (2013.01); *H04W 72/23* (2023.01); *H04W 76/20* (2018.02); *H04W 80/02* (2013.01)

(58) Field of Classification Search
CPC ..... H04W 16/28; H04W 16/14; H04W 76/20; H04W 72/1273; H04W 72/1289;
(Continued)

(56) References Cited

U.S. PATENT DOCUMENTS

2010/0226325 A1* 9/2010 Chun ................. H04W 28/065
                                                    370/329
2016/0302248 A1* 10/2016 Yi ......................... H04W 72/21
(Continued)

FOREIGN PATENT DOCUMENTS

JP    2022-527775 A    6/2022
WO   2020/197308 A1   10/2020

OTHER PUBLICATIONS

Office Action issued in counterpart Japanese Patent Application No. 2021-539754 mailed on Jun. 27, 2023 (8 pages).
(Continued)

*Primary Examiner* — Rasheed Gidado
(74) *Attorney, Agent, or Firm* — Osha Bergman Watanabe & Burton LLP

(57) ABSTRACT

A user equipment includes a receiver that receives information associated with a TCI state for a PDSCH from a base station apparatus, a controller that individually applies, based on the information associated with a TCI state, configurations associated with a QCL to respective PDSCHs transmitted from a first TRP or panel, or a second TRP or panel, and a communication unit that performs communication via the PDSCHs to which the configurations associated with the QCL are applied. The information associated with the TCI state includes an RRC signaling, a MAC signaling and DCI, the PRO signaling includes multiple TCI states, the MAC signaling activates a number of TCI states applied to the second TRP or panel from among the multiple TCI states, and the DCI has a field indicating, from among the number of activated TCI states, a TCI state for a PDSCH transmitted from the second TRP or panel.

6 Claims, 11 Drawing Sheets

(51) Int. Cl.
| | |
|---|---|
| *H04W 72/1273* | (2023.01) |
| *H04W 72/23* | (2023.01) |
| *H04W 76/20* | (2018.01) |
| *H04W 80/02* | (2009.01) |

(58) Field of Classification Search
CPC .... H04W 72/23; H04W 80/02; H04B 7/0404; H04B 7/0617
See application file for complete search history.

(56) References Cited

U.S. PATENT DOCUMENTS

| | | | |
|---|---|---|---|
| 2019/0141693 A1* | 5/2019 | Guo | H04W 72/1268 |
| 2020/0053757 A1* | 2/2020 | Bagheri | H04L 5/10 |
| 2020/0229161 A1* | 7/2020 | Raghavan | H04W 24/10 |
| 2020/0267734 A1* | 8/2020 | Khoshnevisan | H04W 80/02 |
| 2021/0250152 A1* | 8/2021 | Zhang | H04B 7/0408 |

OTHER PUBLICATIONS

Certified Korean Priority Application 10-2019-0036223 filed Mar. 28, 2019 (76 pages).

Extended European Search Report issued in counterpart European Patent Application No. 19940965.7, mailed on Mar. 24, 2023 (8 pages).

Samsung; "MAC CE design for support of multiple beam indication for multiple TRPs"; 3GPP TSG-RAN WG2 Meeting #106, R2-1907715; Reno, USA; May 13-17, 2019 (7 pages).

3GPP TS 38.300 V15.4.0 "3rd Generation Partnership Project; Technical Specification Group Radio Access Network; NR; NR and NG-RAN Overall Description; Stage 2 (Release 15)" Dec. 2018 (97 pages).

3GPP TS 38.321 V15.4.0 "3rd Generation Partnership Project; Technical Specification Group Radio Access Network; NR; Medium Access Control (MAC) protocol specification (Release 15)" Dec. 2018 (77 pages).

3GPP TS 38.214 V15.4.0 "3rd Generation Partnership Project; Technical Specification Group Radio Access Network; NR; Physical layer procedures for data (Release 15)" Dec. 2018 (102 pages).

3GPP TSG RAN WG1 #97; R1-1906236 "Enhancements on Multi-TRP and Multi-panel Transmission" ZTE; Reno, USA; May 13-17, 2019 (14 pages).

International Search Report issued in International Application No. PCT/JP2019/031914, mailed Mar. 3, 2020 (3 pages).

Written Opinion issued in International Application No. PCT/JP2019/031914; Dated Mar. 3, 2020 (3 pages).

Office Action issued in the counterpart Chinese Application No. 201980099132.5, mailed Jun. 5, 2023 (17 pages).

\* cited by examiner

FIG.5

| R | Serving Cell ID | | | | | BWP ID | | Oct 1 |
|---|---|---|---|---|---|---|---|---|
| T7 | T6 | T5 | T4 | T3 | T2 | T1 | T0 | Oct 2 |
| T15 | T14 | T13 | T12 | T11 | T10 | T9 | T8 | Oct 3 |

...

| T(N-2)×8+7 | T(N-2)×8+6 | T(N-2)×8+5 | T(N-2)×8+4 | T(N-2)×8+3 | T(N-2)×8+2 | T(N-2)×8+1 | T(N-2)×8 | Oct N |
|---|---|---|---|---|---|---|---|---|
| R | 1st TCI State mapped to DCI codepoint 000 | | | P | 2nd TCI State mapped to DCI codepoint 000 | | | Oct N+1 |
| R | 1st TCI State mapped to DCI codepoint 001 | | | P | 2nd TCI State mapped to DCI codepoint 001 | | | Oct N+2 |

...

| R | 1st TCI State mapped to DCI codepoint 111 | P | 2nd TCI State mapped to DCI codepoint 111 | Oct N+8 |
|---|---|---|---|---|

FIG.6

| | | | | | | | | |
|---|---|---|---|---|---|---|---|---|
| R | Serving Cell ID | | | | | | | Oct 1 |
| T7 | T6 | T5 | T4 | T3 | T2 | T1 | T0 | Oct 2 |
| T15 | T14 | T13 | T12 | T11 | T10 | T9 | T8 | Oct 3 |

| | | | | | | | |
|---|---|---|---|---|---|---|---|
| T(N-2)×8+7 | T(N-2)×8+6 | T(N-2)×8+5 | T(N-2)×8+4 | T(N-2)×8+3 | T(N-2)×8+2 | T(N-2)×8+1 | T(N-2)×8 | Oct N |
| AT7 | AT6 | AT5 | AT4 | AT3 | AT2 | AT1 | AT0 | Oct N+1 (For DCI codepoint 000) |
| AT7 | AT6 | AT5 | AT4 | AT3 | AT2 | AT1 | AT0 | Oct N+2 (For DCI codepoint 001) |

| | | | | | | | |
|---|---|---|---|---|---|---|---|
| AT7 | AT6 | AT5 | AT4 | AT3 | AT2 | AT1 | AT0 | Oct N+8 (For DCI codepoint 111) |

FIG.7

| R | Serving Cell ID | | | BWP ID | | | | Oct 1 |
|---|---|---|---|---|---|---|---|---|
| R | R | R | R | DCI codepoint | | | P | Oct 2 |
| $T_7$ | $T_6$ | $T_5$ | $T_4$ | $T_3$ | $T_2$ | $T_1$ | $T_0$ | Oct 3 |
| $T_{15}$ | $T_{14}$ | $T_{13}$ | $T_{12}$ | $T_{11}$ | $T_{10}$ | $T_9$ | $T_8$ | Oct 4 |

...

| $T_{(N-3) \times 8+7}$ | $T_{(N-3) \times 8+6}$ | $T_{(N-3) \times 8+5}$ | $T_{(N-3) \times 8+4}$ | $T_{(N-3) \times 8+3}$ | $T_{(N-3) \times 8+2}$ | $T_{(N-3) \times 8+1}$ | $T_{(N-3) \times 8}$ | Oct N |

...

| $T_7$ | $T_6$ | $T_5$ | $T_4$ | $T_3$ | $T_2$ | $T_1$ | $T_0$ |
|---|---|---|---|---|---|---|---|
| $T_{15}$ | $T_{14}$ | $T_{13}$ | $T_{12}$ | $T_{11}$ | $T_{10}$ | $T_9$ | $T_8$ |

...

| $T_{(N-3) \times 8+7}$ | $T_{(N-3) \times 8+6}$ | $T_{(N-3) \times 8+5}$ | $T_{(N-3) \times 8+4}$ | $T_{(N-3) \times 8+3}$ | $T_{(N-3) \times 8+2}$ | $T_{(N-3) \times 8+1}$ | $T_{(N-3) \times 8}$ |

...

| R | R | R | R | DCI codepoint | | | P | Up to 8 DCI codepoints |
|---|---|---|---|---|---|---|---|---|
| $T_7$ | $T_6$ | $T_5$ | $T_4$ | $T_3$ | $T_2$ | $T_1$ | $T_0$ | |
| $T_{15}$ | $T_{14}$ | $T_{13}$ | $T_{12}$ | $T_{11}$ | $T_{10}$ | $T_9$ | $T_8$ | |

...

| $T_{(N-3) \times 8+7}$ | $T_{(N-3) \times 8+6}$ | $T_{(N-3) \times 8+5}$ | $T_{(N-3) \times 8+4}$ | $T_{(N-3) \times 8+3}$ | $T_{(N-3) \times 8+2}$ | $T_{(N-3) \times 8+1}$ | $T_{(N-3) \times 8}$ |
|---|---|---|---|---|---|---|---|

...

| $T_7$ | $T_6$ | $T_5$ | $T_4$ | $T_3$ | $T_2$ | $T_1$ | $T_0$ |
|---|---|---|---|---|---|---|---|
| $T_{15}$ | $T_{14}$ | $T_{13}$ | $T_{12}$ | $T_{11}$ | $T_{10}$ | $T_9$ | $T_8$ |

...

| $T_{(N-3) \times 8+7}$ | $T_{(N-3) \times 8+6}$ | $T_{(N-3) \times 8+5}$ | $T_{(N-3) \times 8+4}$ | $T_{(N-3) \times 8+3}$ | $T_{(N-3) \times 8+2}$ | $T_{(N-3) \times 8+1}$ | $T_{(N-3) \times 8}$ |
|---|---|---|---|---|---|---|---|

FIG.8

| R | Serving Cell ID | | | | | BWP ID | | Oct 1 |
|---|---|---|---|---|---|---|---|---|
| R | R | R | R | R | DCI codepoint | | | Oct 2 |
| T7 | T6 | T5 | T4 | T3 | T2 | T1 | T0 | Oct 3 |
| T15 | T14 | T13 | T12 | T11 | T10 | T9 | T8 | Oct 4 |

...

| T(N-3)×8+7 | T(N-3)×8+6 | T(N-3)×8+5 | T(N-3)×8+4 | T(N-3)×8+3 | T(N-3)×8+2 | T(N-3)×8+1 | T(N-3)×8 | Oct N |
|---|---|---|---|---|---|---|---|---|

| R | R | R | R | R | DCI codepoint | | |
|---|---|---|---|---|---|---|---|
| T7 | T6 | T5 | T4 | T3 | T2 | T1 | T0 |
| T15 | T14 | T13 | T12 | T11 | T10 | T9 | T8 |

Up to 8 DCI codepoints

...

| T(N-3)×8+7 | T(N-3)×8+6 | T(N-3)×8+5 | T(N-3)×8+4 | T(N-3)×8+3 | T(N-3)×8+2 | T(N-3)×8+1 | T(N-3)×8 |
|---|---|---|---|---|---|---|---|

FIG.9

| R | Serving Cell ID | | | | | BWP ID | | Oct 1 |
|---|---|---|---|---|---|---|---|---|
| T7 | T6 | T5 | T4 | T3 | T2 | T1 | T0 | Oct 2 |
| T15 | T14 | T13 | T12 | T11 | T10 | T9 | T8 | Oct 3 |

...

| T(N-2)×8+7 | T(N-2)×8+6 | T(N-2)×8+5 | T(N-2)×8+4 | T(N-2)×8+3 | T(N-2)×8+2 | T(N-2)×8+1 | T(N-2)×8 | Oct N |

...

| $T_{M,7}$ | $T_{M,6}$ | $T_{M,5}$ | $T_{M,4}$ | $T_{M,3}$ | $T_{M,2}$ | $T_{M,1}$ | $T_{M,0}$ |
|---|---|---|---|---|---|---|---|
| $T_{M,15}$ | $T_{M,14}$ | $T_{M,13}$ | $T_{M,12}$ | $T_{M,11}$ | $T_{M,10}$ | $T_{M,9}$ | $T_{M,8}$ |

Up to 8 DCI codepoints

...

| $T_{M,(N-2)×8+7}$ | $T_{M,(N-2)×8+6}$ | $T_{M,(N-2)×8+5}$ | $T_{M,(N-2)×8+4}$ | $T_{M,(N-2)×8+3}$ | $T_{M,(N-2)×8+2}$ | $T_{M,(N-2)×8+1}$ | $T_{M,(N-2)×8}$ |
|---|---|---|---|---|---|---|---|

FIG.10

| R | Serving Cell ID | | | | | | | BWP ID | | Oct 1 |
|---|---|---|---|---|---|---|---|---|---|---|
| $T_7$ | $T_6$ | $T_5$ | $T_4$ | $T_3$ | $T_2$ | | $T_1$ | | $T_0$ | Oct 2 |
| $T_{15}$ | $T_{14}$ | $T_{13}$ | $T_{12}$ | $T_{11}$ | $T_{10}$ | | $T_9$ | | $T_8$ | Oct 3 |

...

| $T_{(N-2)}\times 8+7$ | $T_{(N-2)}\times 8+6$ | $T_{(N-2)}\times 8+5$ | $T_{(N-2)}\times 8+4$ | $T_{(N-2)}\times 8+3$ | $T_{(N-2)}\times 8+2$ | $T_{(N-2)}\times 8+1$ | $T_{(N-2)}\times 8$ | Oct N |
|---|---|---|---|---|---|---|---|---|
| P | 1st TCI State mapped to DCI codepoint 000 | | | P | 2nd TCI State mapped to DCI codepoint 000 | | | Oct N+1 |
| P | 1st TCI State mapped to DCI codepoint 001 | | | P | 2nd TCI State mapped to DCI codepoint 001 | | | Oct N+2 |

...

| P | 1st TCI State mapped to DCI codepoint 111 | P | 2nd TCI State mapped to DCI codepoint 111 | Oct N+8 |
|---|---|---|---|---|

USER EQUIPMENT, BASE STATION APPARATUS AND COMMUNICATION METHOD

TECHNICAL FIELD

The present invention relates to a user equipment, a base station apparatus and a communication method in a radio communication system.

BACKGROUND ART

In NR (New Radio) (also referred to as "5G") as a successor system of LTE (Long Term Evolution), techniques for satisfying requirements of a high capacity system, a fast data transmission speed, a low latency, simultaneous connection of a large number of terminals, a low cost, power saving or the like are being discussed (for example, non-patent document 1).

In the NR system, information indicative of a TCI (Transmission Configuration Indicator) state applied to transmission of downlink signals is indicated from a base station apparatus to a user equipment. The TCI state is information associated with a QCL (Quasi Co-Location) and corresponds to a spatial reception parameter for an antenna port, for example. The user equipment applies the TCI state to receive a downlink signal transmitted from the base station apparatus (for example, non-patent document 2).

PRIOR ART DOCUMENT

Non-Patent Document

[Non-Patent Document 1] 3GPP TS 38.300 V15.4.0 (2018-12)
[Non-Patent Document 2] 3GPP TS 38.321 V15.4.0 (2018-12)
[Non-Patent Document 3] 3GPP TS 38.214 V15.4.0 (2018-12)

SUMMARY OF INVENTION

Problem to be Solved by the Invention

In the NR radio communication system, enhanced functionalities of MIMO (Multiple-Input and Multiple-Output) include transmission using multiple TRPs (Transmission Reception Points) or panels, for example. Here, there are cases where configurations associated with the QCL for a receiver for the respective TRPs or panels are not performed appropriately depending on formats of control signals.

In light of the above aspect, the present invention aims to configure communication using a plurality of TRPs (Transmission Reception Points) or panels.

Means for Solving the Problem

According to a technique disclosed herein, there is provided a user equipment, comprising: a reception unit that receives information associated with a transmission configuration state for a downlink shared channel from a base station apparatus; a control unit that individually applies, based on the information associated with a transmission configuration state, configurations associated with a QCL (Quasi Co-Location) to respective downlink shared channels transmitted from a first TRP (Transmission Reception Point) or panel or a second TRP or panel; and a communication unit that performs communication via the downlink shared channels to which the configurations associated with the QCL are applied individually, wherein the information associated with the transmission configuration state includes an RRC (Radio Resource Control) signaling, a MAC (Media Access Control) signaling and DCI (Downlink Control Information), the RRC signaling includes multiple transmission configuration states, the MAC signaling activates a first number of transmission configuration states applied to the second TRP or panel from among the multiple transmission configuration states, and the DCI has a field that indicates, from among the first number of activated transmission configuration states, a transmission configuration state for a downlink shared channel to be transmitted from the second TRP or panel.

Advantage of the Invention

According to the disclosed technique, communication using a plurality of TRPs (Transmission Reception Points) or panels can be configured.

BRIEF DESCRIPTION OF DRAWINGS

FIG. 5 is a diagram for illustrating an example of specification change (1) associated with an example of operation according to an embodiment of the present invention;

FIG. 6 is a diagram for illustrating an example of specification change (2) associated with an example of operation according to an embodiment of the present invention;

FIG. 7 is a diagram for illustrating an example of specification change (3) associated with an example of operation according to an embodiment of the present invention;

FIG. 8 is a diagram for illustrating an example of specification change (4) associated with an example of operation according to an embodiment of the present invention;

FIG. 9 is a diagram for illustrating, an example of specification change (5) associated with an example of operation according to an embodiment of the present invention;

FIG. 10 is a diagram for illustrating an example of specification change (6) associated with an example of operation according to an embodiment of the present invention;

EMBODIMENTS OF THE INVENTION

Hereinafter, embodiments of the present invention will be described with reference to the drawings. The embodiments described below are merely one example, and embodiments to which the present invention is applied are not limited to the following embodiments.

In operations of a radio communication system of an embodiment of the present invention, existing techniques are used as needed. Note that the existing techniques are existing LTE, for example, but are not limited to the existing LTE. Also, unless specifically stated otherwise, it should be appreciated that the terminology "LTE" used herein has a broader meaning including LTE-Advanced and its subsequent schemes (e.g., NR).

Also, in embodiments of the present invention as described below, terminologies "SS (Synchronization Signal)", "PSS (Primary SS)", "SSS (Secondary SS)", "PBCH (Physical Broadcast Channel)". "PRACH (Physical Random Access Channel)" or the like used in the existing LTE are used. This is due to convenience of recitations, and a signal, a function or the like similar to them may be referred to as other wordings. Also, the above terminologies correspond to "NR-SS", "NR-PSS", "NR-SSS", "NR-PBCH" and "NR-PRACH", respectively, in the NR. Note that even if the signals are used in the NR, they may not be explicitly described as "NR-".

Also, in embodiments of the present invention, a duplex scheme may be TDD (Time Division Duplex) scheme, FDD (Frequency Division Duplex) scheme or other schemes (e.g. flexible duplex scheme or the like).

Also, in embodiments of the present invention, "configuring" a radio parameter or the like may mean that a predetermined value is pre-configured or that a radio parameter indicated from the base station apparatus 10 or the user equipment 20 is configured.

Figure 1:
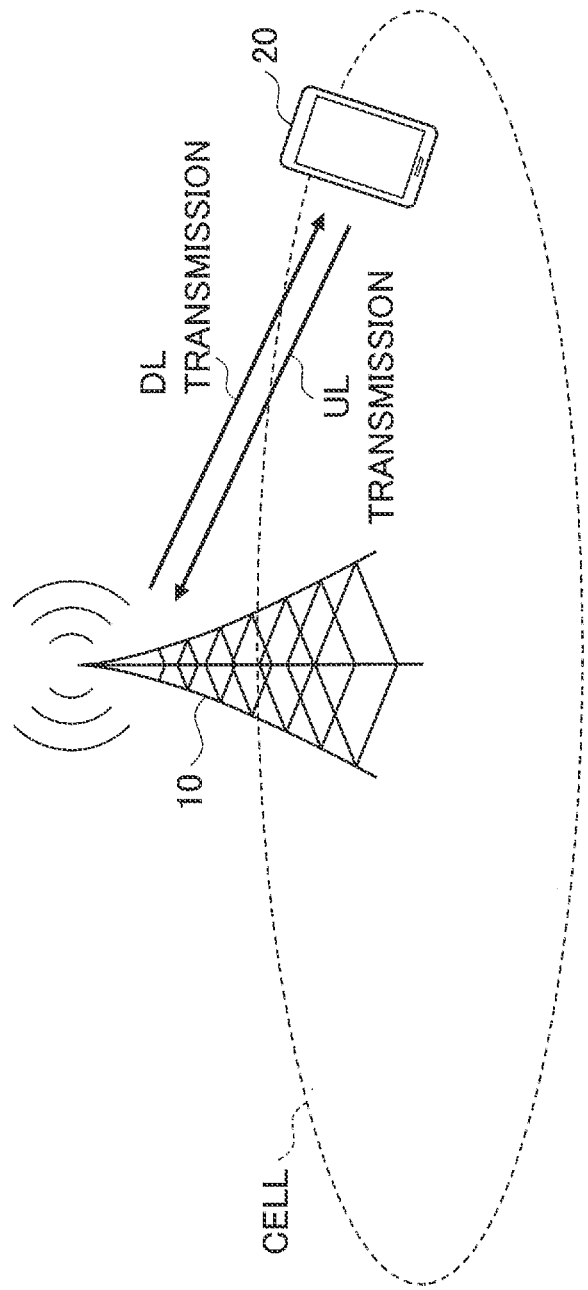
FIG. 1 is a diagram for illustrating a radio communication system according to an embodiment of the present invention.

FIG. 1 is a diagram for illustrating a radio communication system according to an embodiment of the present invention. As illustrated in FIG. 1, a radio communication system according to an embodiment of the present invention includes a base station apparatus 10 and a user equipment 20. In FIG. 1, the single base station apparatus 10 and the single user equipment 20 are illustrated, but this is an example, and a plurality of base station apparatuses 10 and a plurality of user equipments 20 may be provided.

The base station apparatus 10 is a communication apparatus that serves one or more cells and performs radio communication with the user equipment 20. Physical resources for a radio signal are defined with a temporal domain and a frequency domain. The temporal domain may be defined with the number of OFDM symbols, and the frequency domain may be defined with the number of subcarriers or the number of resource blocks. The base station apparatus 10 transmits a synchronization signal and system information to the user equipment 20. The synchronization signal may be an NR-PSS and an NR-SSS, for example. The system information may be transmitted in an NR-PBCH and may be also referred to as broadcast information, for example. As illustrated in FIG. 1, the base station 10 transmits a control signal or data in DL (Downlink) to the user equipment 20 and receives a control signal or data in UL (Uplink) from the user equipment 20. Any of the base station apparatus 10 and the user equipment 20 can perform transmission and reception of signals with beamforming. Also, any of the base station apparatus 10 and the user equipment 20 can apply MIMO (Multiple Input Multiple Output) communication to the DL or the UL. Also, any of the base station apparatus 10 and the user equipment 20 may perform communication using CA (Carrier Aggregation) via a SCell (Secondary Cell and a PCell (Primary Cell).

The user equipment 20 is a communication apparatus having a radio communication function such as a smartphone, a portable phone, a tablet, a wearable terminal and a M2M (Machine-to-Machine) communication module. As illustrated in FIG. 1, the user equipment 20 receives a control signal or data in DL from the base station apparatus and transmits a control signal or data in UL to the base station apparatus 10 to use various communication services provided by the radio communication system.

Multi-TRP transmission or multi-panel transmission for transmitting a PDSCH (Physical Downlink Shared Channel) from multiple TRPs (Transmission Reception Points) or panels is being discussed as an enhancement of the MIMO for the NR. In the multi-TRP transmission or the multi-panel transmission, scheduling and configuration with a single PDCCH (Physical Downlink Control Channel) are discussed. In the case of scheduling and configuration with the single PDCCH, the PDSCH transmitted from one or more TRPs or panels via the single PDCCH is scheduled. Also, in the case of two TRPs transmission in DCI (Downlink Control Information) included in the PDCCH, for example, TCI (Transmission Configuration Indicator) states for TRP #1 and TRP #2 are indicated to the user equipment 20, and the QCL for the PDSCH is assumed.

In order to configure the TCI state for the user equipment 20, a list of TCI states per cell and per BWP (Bandwidth Part) is indicated to the user equipment 20 in a "PDSCH-Config" as an RRC signaling. For example, the 128 or more TCI states may be included in the list. Moreover, mapping between the TCI states included in the list and DCI codepoints for indicating the TCI states is indicated to the user equipment 20 with a MAC (media Access Control) signaling. For example, the number of DCI codepoints for indicating the TCI states may be up to eight or more than eight. The MAC signaling may mean signaling with a MAC CE (Control Element).

Here, in the conventional MAC signaling, only one TCI state included in the list can be mapped to the DCI codepoint for indicating the TCI state. Accordingly, in the case of the multi-TRP transmission or the multi-panel transmission, it is difficult to configure specific TCI states for respective PDSCHs transmitted from the multiple TRPs or panels.

Figure 2:
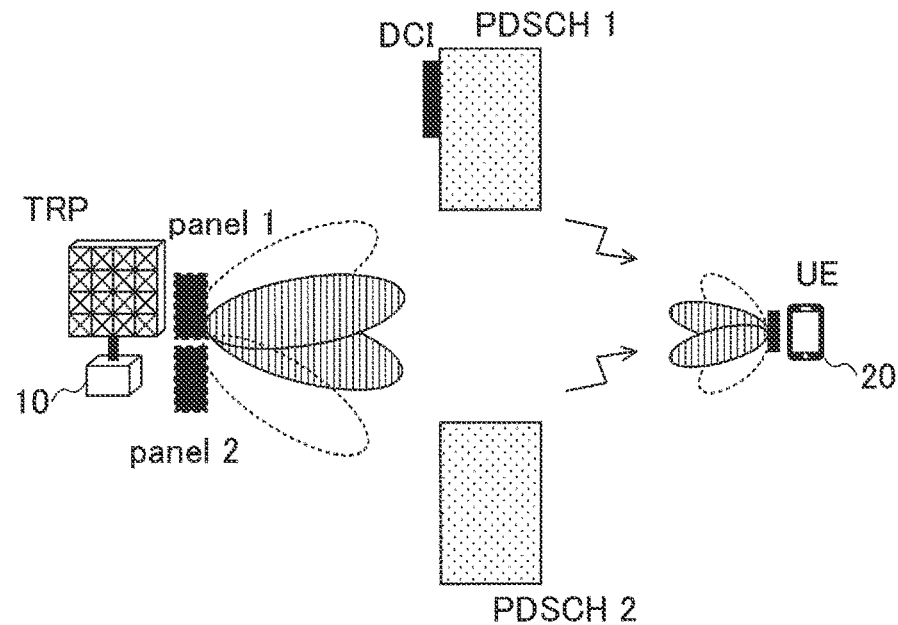
FIG. 2 is a diagram for illustrating transmission using multiple panels according to an embodiment of the present invention.

FIG. 2 is a diagram for illustrating transmission using multiple panels according an embodiment of the present invention. As illustrated in FIG. 2, the base station apparatus 10 uses two panels (panel 1 and panel 2) in one TRP for transmission to the user equipment 20. A PDCCH including DCI and a PDSCH1 are transmitted from panel 1, and a PDSCH2 is transmitted from panel 2. In other words, in a case of scheduling and configuration with a single PDCCH, the user equipment 20 receives two PDSCHs based on the single DCI.

Figure 3:
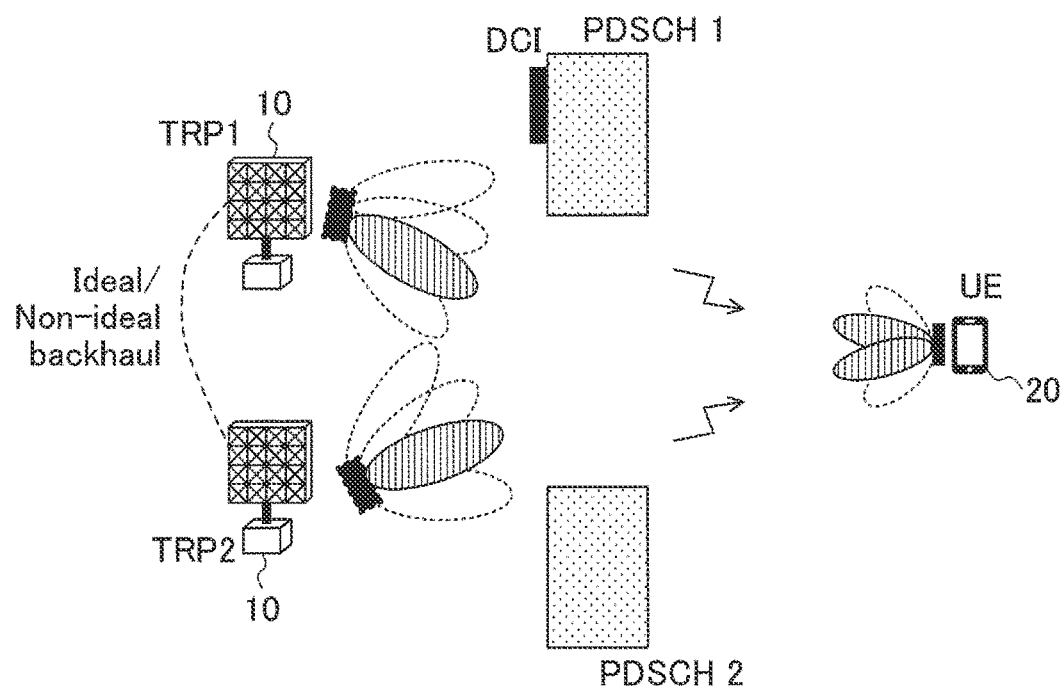
FIG. 3 is a diagram for illustrating transmission using multiple TRPs according to an embodiment of the present invention.

FIG. 3 is a diagram for illustrating transmission using multiple TRPs according to an embodiment of the present invention. As illustrated in FIG. 3, the base station apparatus 10 uses two TRPs (TRP 1 and TRP 2) for transmission to the user equipment 20. A PDCCH including DCI and a PDSCH1 are transmitted from TRP 1, and a PDSCH2 is transmitted from TRP 2. In other words, in a case of scheduling and configuration with a single PDCCH, the user equipment 20 receives two PDSCHs based on the single DCI.

Figure 4:
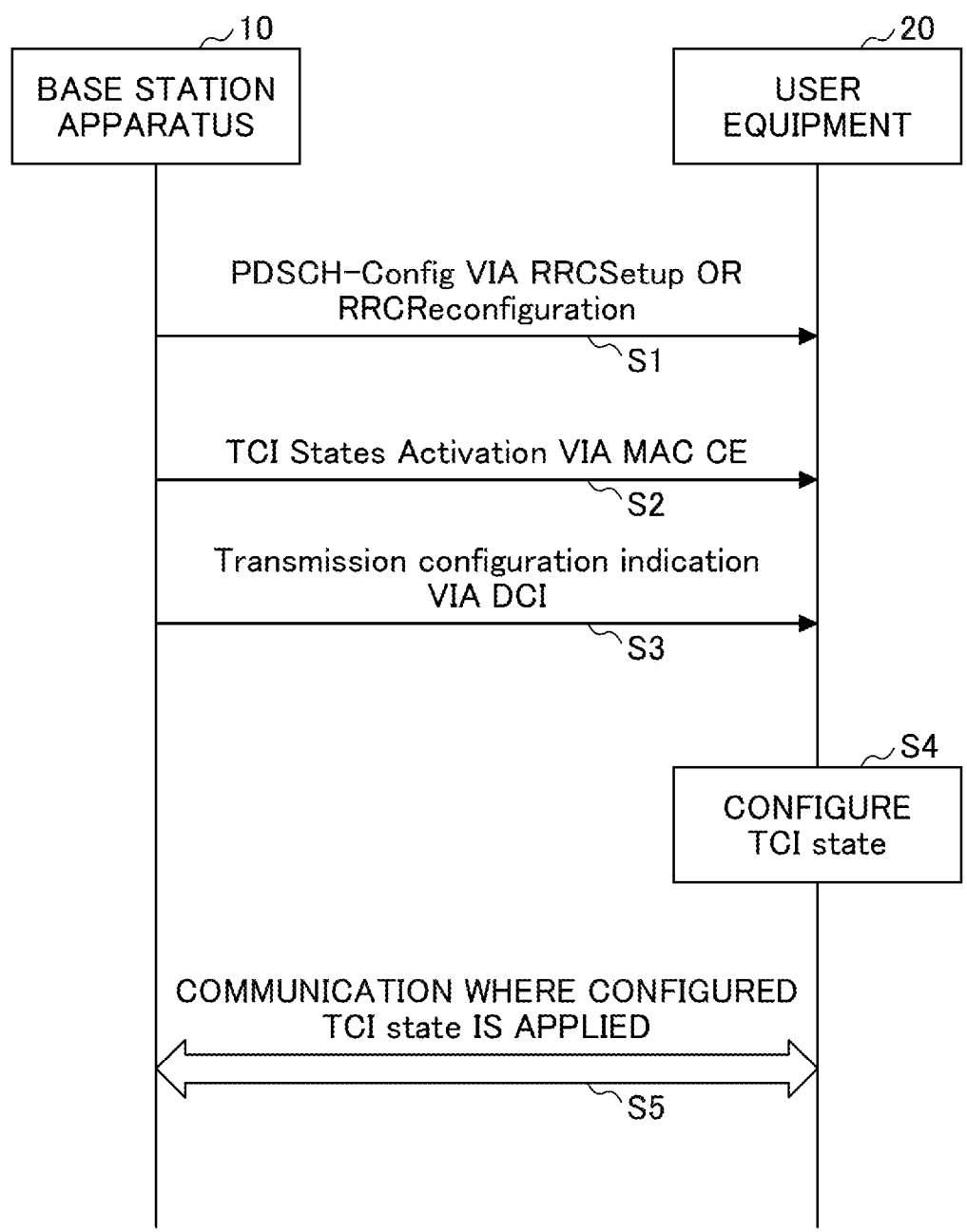
FIG. 4 is a sequence diagram for illustrating an example of operation according to an embodiment of the present invention.

FIG. 4 is a sequence diagram for illustrating an example of operation according to an embodiment of the present invention. An operation for configuring the TCI state for the user equipment 20 is described with reference to FIG. 4.

At step S1, the base station apparatus 10 transmits a "PDSCH-Config" via an "RRCSetup" or an "RRCReconfiguration", which is an RRC signaling, to the user equipment 20. The "PDSCH-Config" may include a list including up to 128 TCI states, for example. More TCI states may be included in the list. The TCI states include information regarding a QCL associated with a spatial reception parameter.

The QCL indicates that parameters are common between a reference signal including one or more synchronization signals or the like and a reference signal for data demodulation, and four types of QCLs are defined (for example, non-patent document 3).

QCL-Type A: A Doppler shift, a Doppler spread, an average delay and a delay spread are the same.

QCL-Type B: A Doppler shift and a Doppler spread are the same.

QCL-Type C: A Doppler shift and an average delay are the same.

QCL-Type D: A spatial Rx parameter is the same.

At step S2, the base station apparatus 10 transmits a "TCI States Activation" via a MAC CE to the user equipment 20. By the "TCI States Activation", multiple TCI states included in the list received at step S1 are mapped to TCI states, corresponding to respective DCI codepoints, applied to the PDSCH for serving cells. In other words, TCI state candidates to be used are activated from among the TCI states included in the list.

By the MAC CE, enhanced activation or deactivation is performed for the TCI state for the PDSCH that is specific to UE for multi-TRP transmission or multi-panel transmission based on the single PDCCH. For example, the respective TCI states for the PDSCH may be deactivated as an initial state after handover, for example. Upon receiving the MAC CE, a MAC entity indicates information associated with activation or deactivation for the TCI state to the lower layer. Note that "multi-TRP or multi-panel" may be defined as a DMRS (Demodulation Reference Signal) port group, as an antenna port group, as a group associated with other reference signals or as a TCI state group.

The MAC CE for performing enhanced activation or deactivation for the UE specific TCI state for the PDSCH for multi-TRP transmission or multi-panel transmission based on the single PDCCH is identified with a LCID (Logical Channel ID) included in a MAC PDU subheader. The MAC CE configures activation for up to eight TCI states, for example, from multiple TCI states configured with an information element "tci-StatesToAddModList" and "tci-StatesToReleaseList". Moreover, for example, by the MAC CE, one or two activated TCI states are mapped to a value of "Transmission Configuration Indication" field of the DCI, that is, a DCI codepoint. The TCI state activated with the MAC CE is mapped to the DCI codepoint in the ascending order. Details of the mapping are described below.

At step S3, the base station apparatus 10 transmits a "Transmission configuration indication" in the DCI to the user equipment 20. By the "Transmission configuration indication", the user equipment 20 receives a DCI codepoint. The user equipment 20 identifies the TCI state corresponding to the DCI codepoint in accordance with the mapping at step S2.

At step S4, the user equipment 20 configures the identified TCI state for the PDSCH. Then, the user equipment 20 and the base station apparatus 10 applies the configured TCI state to communication.

FIG. 5 is an example of specification change (1) associated with an example of operation according to an embodiment of the present invention. The mapping between the DCI codepoints and the TCI states included in the list with the MAC CE at step S2 illustrated in FIG. 4 is described with reference to FIG. 5.

A "Serving Cell ID" illustrated in FIG. 5 is an identifier for a serving cell to which the MAC CE is applied. A "END TD" illustrated in FIG. 5 is an identifier for a DL-BW P to which the MAC CE is applied.

If a TCI state ID (TCI-StateId) (i) configured with an information element "tci-StatesToAddModList" and "tci-StatesToReleaseList" included in the RRC signaling "PDSCH-Config" exists, "$T_i$" illustrated in FIG. 5 indicates activation or deactivation of the TCI state corresponding to the TCI state ID(i). The TCI state corresponding to the TCI state ID(i) is activated and mapped to a DCI codepoint if $T_i=1$ and is deactivated and not mapped to the DCI codepoint if $T_i=0$. Note that if the TCI state ID(i) configured with the information element "tci-StatesToAddModList" and "tci-StatesToReleaseList" included in the RRC signaling "PDSCH-Config" does not exist, $T_i$ is ignored.

The number of activated TCI states may be up to eight or more. For example, the number of activated TCI states may be "2^(the number of bits of DCI Transmission Configuration Indication field)×(the number of TCI states for the PDSCH indicated in a single DCI)".

The "$1^{st}$ TCI State mapped to DCI codepoint xxx" illustrated in FIG. 5 indicates the TCI state mapped to the DCI codepoint xxx applied to the first TRP or panel. Values correspond to the activated TCI states in the ascending order, for example, the value "000" being the first TCI state activated with $T_i$ and the value "001" being the second TCI state activated with $T_i$.

The "P" illustrated in FIG. 5 indicates that if it is configured as 1, the DCI codepoint xxx applied to the second TRP or panel exists. If 0 is configured for the "P" illustrated in FIG. 5, "$2^{nd}$ TCI State mapped to DCI codepoint xxx" is ignored. In other words, transmission is made with a single TRP or panel.

The "$2^{nd}$ TCI State mapped to DCI codepoint xxx" indicates a TCI state mapped to the DCI codepoint xxx applied to the second TRP or panel. For example, the value "000" corresponds to the first TCI state activated with and the value "001" corresponds to the second. TCI state activated with. The values correspond to the TCI states activated in the ascending order.

The "R" illustrated in FIG. 5 is a reserved bit and is configured as "0".

The "$1^{st}$ TCI State mapped to DCI codepoint 000" and the "$2^{nd}$ TCI State mapped to DCI codepoint 000" illustrated in FIG. 5 correspond to the value of DCI Transmission Configuration Indication field being "000", and The "$1^{st}$ TCI State mapped to DCI codepoint 001" and the "$2^{nd}$ TCI State mapped to DCI codepoint 001" correspond to the value of DCI Transmission Configuration Indication field being "001". The number of DCI codepoints for DCI Transmission Configuration indication field may be up to eight (that is, three bits for the field), more than eight (for example, four bits for the field), or less than eight (for example, two bits for the field). Moreover, if the number of TRPs or panels is more than two, the "TCI State mapped to DCI codepoint xxx" indicative of the TCI states mapped to the DCI codepoint xxx applied to the third and fourth TRPs or panels may be provided, or the "P" indicative of their presence may be in a MAC CE.

FIG. 6 is an example of specification change (2) associated with an example of operation according to an embodiment of the present invention. Mapping between the DCI codepoints and the TCI states included in the list at step S2 illustrated in FIG. 4 by a MAC CE is described with reference to FIG. 6.

The "Serving Cell ID", "BWP ID", "$T_i$" and "R" illustrated in FIG. 6 are the same as those in FIG. 5.

The "$AT_i$" illustrated in FIG. 6 is used to map the TCI state activated with "$T_i$" to "DCI Transmission Configuration Indication field". The value "000" of "DCI Transmission Configuration Indication field" corresponds to an octet for "Oct N+1" illustrated in FIG. 6, and the value "001" corresponds to one octet per DCI codepoint such as the octet for "Oct N+2" illustrated in FIG. 6.

For example, the "$AT_0$" illustrated in FIG. 6 corresponds to the first TCI state activated with $T_i$, and the value "$AT_1$" corresponds to the second TCI state activated with $T_i$. In this manner, "$AT_i$" corresponds to the TCI states activated with $T_i$ in the ascending order. For example, for each DCI codepoint, the TCI states activated with up to two $T_i$s may be mapped, and more than two TRPs or panels are present, the TCI states activated with large number of $T_i$s may be mapped. Note that is may be stipulated beforehand or separately configured which of the mapped TCI states correspond to the first TRP or panel and the second TRP or panel.

FIG. 7 is an example of specification change (3) associated with an example of operation according to an embodiment of the present invention. Mapping between the DCI codepoints and the TCI states included in the list at step S2 illustrated in FIG. 4 by a MAC CE is described reference to FIG. 7.

The "Serving Cell ID", "BWP ID", "$T_i$" and "R" illustrated in FIG. 7 are the same as those in FIG. 5.

The "DCI codepoint" illustrated in FIG. 7 indicates the value of "Transmission Configuration Indication field", that is, a codepoint, to which the activated TCI state is mapped.

The "P" illustrated in FIG. 7 indicates that if it is configured to "1", the second $T_i$ field applied to the second TRP or panel is present. If the "P" illustrated in FIG. 7 is configured to "0", the second $T_i$ field is not configured. Namely, transmission can be made with a single TRP or panel.

If the TCI state ID (TCI-StateId) (i) configured with information elements "tci-StatesToAddModList" and "tci-StatesToReleaseList" included in an RRC signaling "PDSCH-Config" is present, the "$T_i$" illustrated in FIG. 7 indicates activation or deactivation for the TCI state corresponding to the TCI state ID(i). The TCI state corresponding to the TCI state ID(i) is activated and mapped to the DCI codepoint if $T_i$=1 and is deactivated and is not mapped to the DCI codepoint if $T_i$=0. Note that if the TCI state ID(i) configured with the information elements "tci-StatesToAddModList" and "tci-StatesToReleaseList" included in the RRC signaling "PDSCH-Config" is not present, the "$T_i$" is ignored.

Per "DCI codepoint", the TCI state applied to the first TRP or panel from a first field set is indicated, or the TCI state applied to the second TRP or panel from a second field set is indicated. In other words, the TCI states activated with a bit map in the $T_i$ field set are indicated. The $T_i$ field set may include the 128 or more TCI states, for example. Also, the number of "DCI codepoint"s may be eight represented by three bits or may be more than eight represented by more than three bits, for example. In addition, more than two TRPs or panels are present number of $T_i$ field sets corresponding to the TRPs or panels may be increased per the "DCI codepoint".

FIG. 8 is an example of specification change (4) associated with an example of operation according to an embodiment of the present invention. Mapping between the DCI cod points and the TCI states included in the list at step S2 illustrated in FIG. 4 by a MAC CE described with reference to FIG. 8.

The "Serving Cell ID", "BWP ID", "$T_i$" and "R" illustrated in FIG. 8 are the same as those in FIG. 7.

Per "DCI codepoint", from a $T_i$ field set: the TCI state applied to the first TRP or panel is indicated; or the TCI state applied to the first TRP or panel and the TCI state applied to the second TRP or panel are indicated. In other words, the TCI states activated with a bit map in the $T_i$ field set are indicated. Similar to FIG. 7, the $T_i$ field set may include 128 or more than 128 TCI states, for example. Also, the number of "DCI codepoint"s may be eight represented by three bits or may be more than eight represented by more than three bits. Note than if multiple TRPs or panels are used, the TCI states corresponding to the number of TRPs or panels may be activated per the DCI codepoint. It may be predetermined or separately configured which of the activated TCI states corresponds to which TRP or panel.

FIG. 9 is an example of specification change (5) associated with an example of operation according to an embodiment of the present invention. Mapping between the DCI codepoints and the TCI states included in the list at step S2 illustrated in FIG. 4 by a MAC CE is described with reference to FIG. 9.

The "Serving Cell ID", "BWP ID", "$T_i$" and "R" illustrated in FIG. 9 are the same as those in FIG. 8.

FIG. 9 corresponds to FIG. 8. In FIG. 9, an octet including the "DCI codepoint" illustrated in FIG. 8 is deleted. The order of field sets corresponds to the DCI codepoints in the ascending order such that the first $T_i$ field set corresponds to the DCI codepoint 000 and a second $T_i$ field set corresponds to the DCI codepoint 001. Similar to FIG. 7, the $T_i$ field set may include 128 or more than 128 TCI states, for example. Also, the number of "DCI codepoint"s may be eight represented by three bits or may be more than eight represented by more than three bits, for example. Note that if multiple TRPs or panels are used, the TCI states corresponding to the number of TRPs or panels may be activated per the DCI codepoint. It may be predetermined or separately configured which of the activated TCI states corresponds to which TRP or panel.

FIG. 10 is an example of specification change (6) associated with an example of operation according to an embodiment of the present invention. Mapping between the DCI codepoints and the TCI states included in the list at step S2 illustrated in FIG. 4 by a MAC CE is described with reference to FIG. 10.

The "Serving Cell ID" illustrated in FIG. 10 is an identifier for a serving cell to which the MAC CE is applied. The "BWP ID" illustrated in FIG. 10 is an identifier for a DL-BWP to which the MAC CE is applied.

If the TCI state ID (TCI-StateId) (i) on with information elements "tci-StatesToAddModList" and "tci-StatesToReleaseList" included in an RRC signaling "PDSCH-Config" is present, the "$T_i$" illustrated in FIG. 10 indicates activation or deactivation of the TCI state corresponding to the TCI state ID (i). The TCI state corresponding to the TCI state ID (i) is activated and mapped to the DCI codepoint if $T_i$=1 and is deactivated and not mapped to the DCI codepoint if $T_i$=0. Note that if the TCI state ID (i) configured with the information elements "tci-StatesToAddModList" and "tci-StatesToReleaseList" included in the RRC signaling "PDSCH-Config" is not present, the $T_i$ is ignored.

The number of the activated TCI states may be up to eight or more than eight. For example, the number of the activated TCI states may be "2^ (the number of bits for DCI Transmission Configuration Indication field)×the number of TCI states for the PDSCH indicated with a single DCI)".

The "$1^{st}$ TCI State mapped to DCI codepoint xxx" illustrated in FIG. 10 indicates the TCI state mapped to the DCI codepoint xxx applied to the first TRP or panel. For example, the value "000" corresponds to the first TCI state activated with $T_i$, and the value "001" corresponds to the second TCI state activated with $T_j$. In this manner, the values correspond to the activated TCI states in the ascending order.

The "$2^{nd}$ TCI State mapped to DCI codepoint xxx" illustrated in FIG. 10 indicates the TCI state mapped to the DCI codepoint xxx applied to the second TRP or panel. For example, the value "000" corresponds to the first TCI state activated with and the value "001" corresponds to the second TCI state activated with $T_j$. In this manner, the values correspond to the activated TCI states in the ascending order.

If the "P" illustrated in FIG. 10 is configured to 1, it indicates that the DCI codepoint xxx applied to the first TRP or panel or the second TRP or panel is present. If the "P" illustrated in FIG. 10 is configured to 0, the "$1^{st}$ TCI State mapped to DCI codepoint xxx" or the "$2^{nd}$ TCI State mapped to DCI codepoint xxx" is ignored. In other words, because transmission is performed with the TRP or panel for which the "P" is configured to 1, it is possible to configure the DCI codepoint xxx to the second TRP or panel with the "$2^{nd}$ TCI State mapped to DCI codepoint xxx, and not to configure the DCI codepoint xxx to the "$1^{st}$ TCI State mapped to DCI codepoint xxx".

The "$1^{st}$ TCI State mapped to DCI codepoint 000" and the "$2^{nd}$ TCI State mapped to DCI codepoint 000" correspond to the value "000" of DCI Transmission Configuration indication field, and the "$1^{st}$ TCI State mapped to DCI codepoint 001" and the "$2^{nd}$ TCI State mapped to DCI codepoint 001" correspond to the value "001" of DCI Transmission Configuration Indication field. The number of DCI codepoints with DCI Transmission Configuration Indication field may be up to eight (namely, three bits for the field) or may be more than (for example, four bits for the field) or less than (for example, two bits for the field) eight. Moreover, if more than two TRPs or panels are present, the "TCI State mapped to DCI codepoint xxx" indicative of the TCI state mapped to the DCI codepoint xxx applied to the third and fourth TRPs or panels may be present, and the "P" indicative of their presence may be resent in a MAC CE.

According to the above-stated embodiments, the user equipment 20 can indicate the TCI states specific to respective PDSCHs transmitted from multiple TRPs or panels of the base station apparatus 10 and perform communication to which proper QCL assumption is applied.

In other words, the communication using multiple TRPs (Transmission Reception Points) or panels can be configured in a radio communication system.

Device Arrangement

Next, exemplary functional arrangements of the base station apparatus 10 and the user equipment 20 that perform operations as stated above are described. The base station apparatus 10 and the user equipment 20 include functions of implementing the above-stated embodiments. Note that the base station apparatus 10 and the user equipment 20 each may have only a portion of the functions of the embodiments.

<Base Station Apparatus 10>

Figure 11:
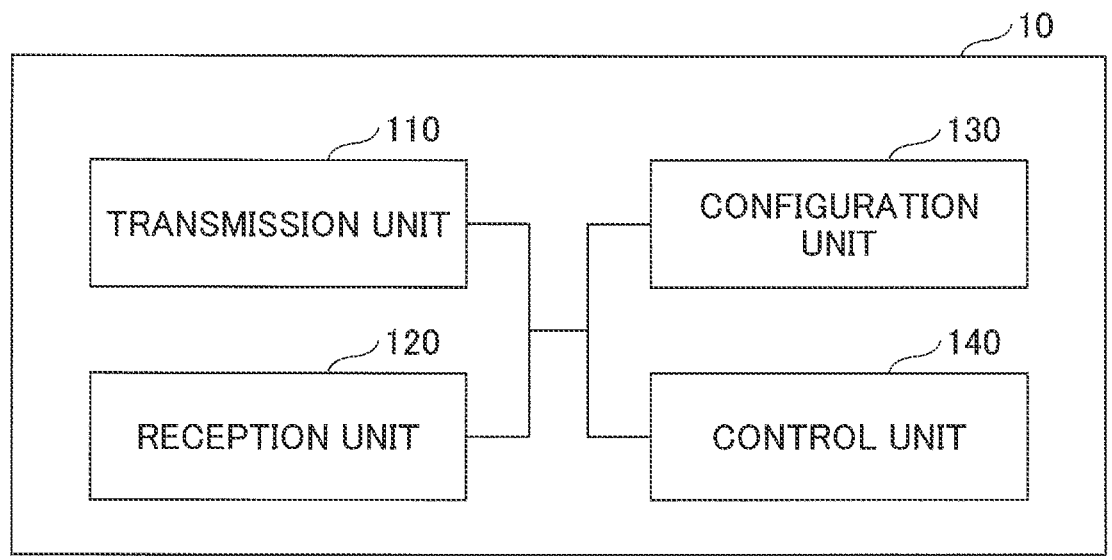
FIG. 11 is a diagram for illustrating one exemplary functional arrangement of a base station apparatus 10 according to an embodiment of the present invention.

FIG. 11 illustrates an example of functional arrangement of the base station apparatus 10. As shown in FIG. 11, the base station apparatus 10 includes a transmission unit 110, a reception unit 120, a configuration unit 130 and a control unit 140. The functional arrangement shown in FIG. 11 is only one example. The functional separation and the names of the functional units may be arbitrary as long as operations according to the present embodiment can be achieved.

The transmission unit 110 includes a function of generating a signal for transmission to the side of the user equipment 20 and wirelessly transmitting the signal. The reception unit 120 includes a function of receiving various signals transmitted from the user equipment 20 and acquiring information for upper layers from the received signals, for example. Also, the transmission unit 110 includes a function of transmitting an NR-PSS, an NR-SSS, an NR-PBCH, a DL/UL control signal or the like to the user equipment 20.

The configuration unit 130 stores preconfigured configurations and various configurations for transmission to the user equipment 20, in a memory device and reads them from the memory device as needed. Contents of the configurations may be communication configurations associated with TRPs or panels for the user equipment 20 or the like, for example.

The control unit 140 performs processing associated with the communication configurations associated with TRPs or panels for the user equipment 20 as stated in conjunction with the embodiments. Also, the control unit 140 controls communication using multiple TRPs or panels as stated in conjunction with the embodiments. The functional portions of the control unit 140 related to signal transmission may be included in the transmission unit 110, and the functional portions of the control unit 140 related to signal reception may be included in the reception unit 120.

<User Equipment 20>

Figure 12:
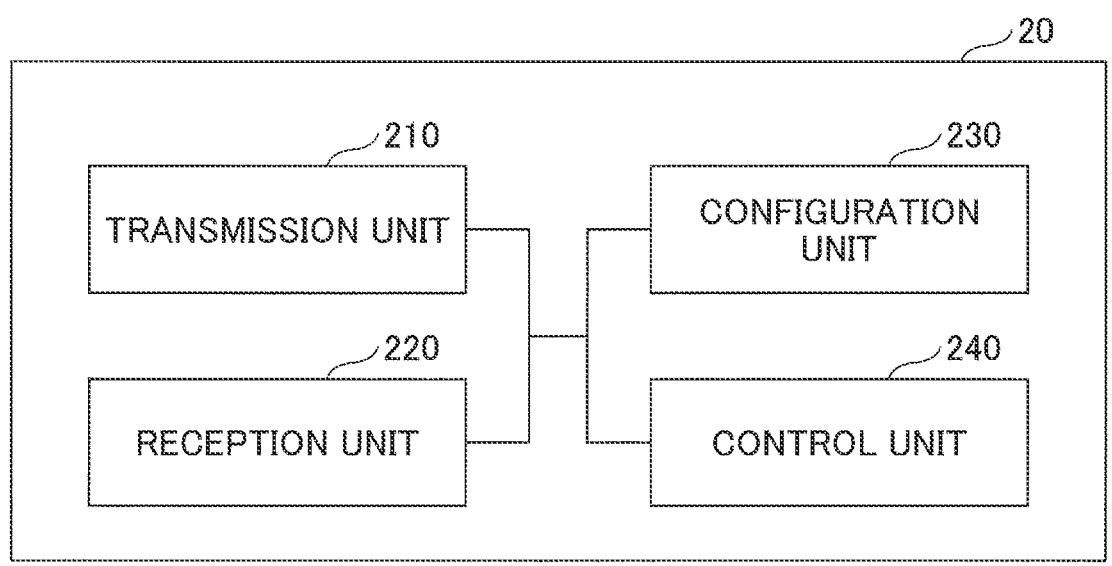
FIG. 12 is a diagram for illustrating one exemplary functional arrangement of a user equipment 20 according to an embodiment of the present invention.

FIG. 12 is a diagram for illustrating one exemplary functional arrangement of the user equipment 20. As illustrated in FIG. 12, the user equipment 20 has a transmission unit 210, a reception unit 220, a configuration unit 230 and a control unit 240. The functional arrangement shown in FIG. 12 is only one example. The functional separation and the names of the functional units may be arbitrary as long as operations according to the present embodiment can be achieved.

The transmission unit 210 generates a transmission signal from transmission data and wirelessly transmits the transmission signal. The reception unit 220 wirelessly receives various signals and acquires signals for upper layers from the received physical layer signals. Also, the reception unit 220 has a function of receiving an NR-PSS, an NR-SSS, an NR-PBCH, a DL/UL/SL control signal and so on transmitted from the base station apparatus 10. Also, for example, as D2D communication, the transmission unit 210 transmits a PSCCH (Physical Sidelink Control Channel), a PSSCH (Physical Sidelink Shared Channel), a PSDCH (Physical Sidelink Discovery Channel), a PSBCH (Physical Sidelink Broadcast Channel) or the like to other user equipments 20, and the reception unit 120 receives the PSCCH, the PSSCH, the PSDCH, the PSBCH or the like from other user equipments 20.

The configuration unit 230 stores various configurations received at the reception unit 220 from the base station apparatus 10 or the user equipments 20. Also, the configuration unit 230 stores preconfigured configurations. Contents of the configurations may be communication configurations associated with TRPs or panels for the user equipment 20 and so on, for example.

The control unit 240 controls communication using multiple TRPs or panels based on communication configurations acquired from the base station apparatus 10. The functional portion of the control unit 240 regarding signal transmission may be included in the transmission unit 210, and the functional portion of the control unit 240 regarding signal reception may be included in the reception unit 220.

Hardware Arrangement

The block diagrams (FIGS. 11 and 12) used for the description of the above embodiments show blocks of functional units. These functional blocks (components) are implemented by any combination of at least one of hardware and software. In addition, the implementation method of each function block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 13:
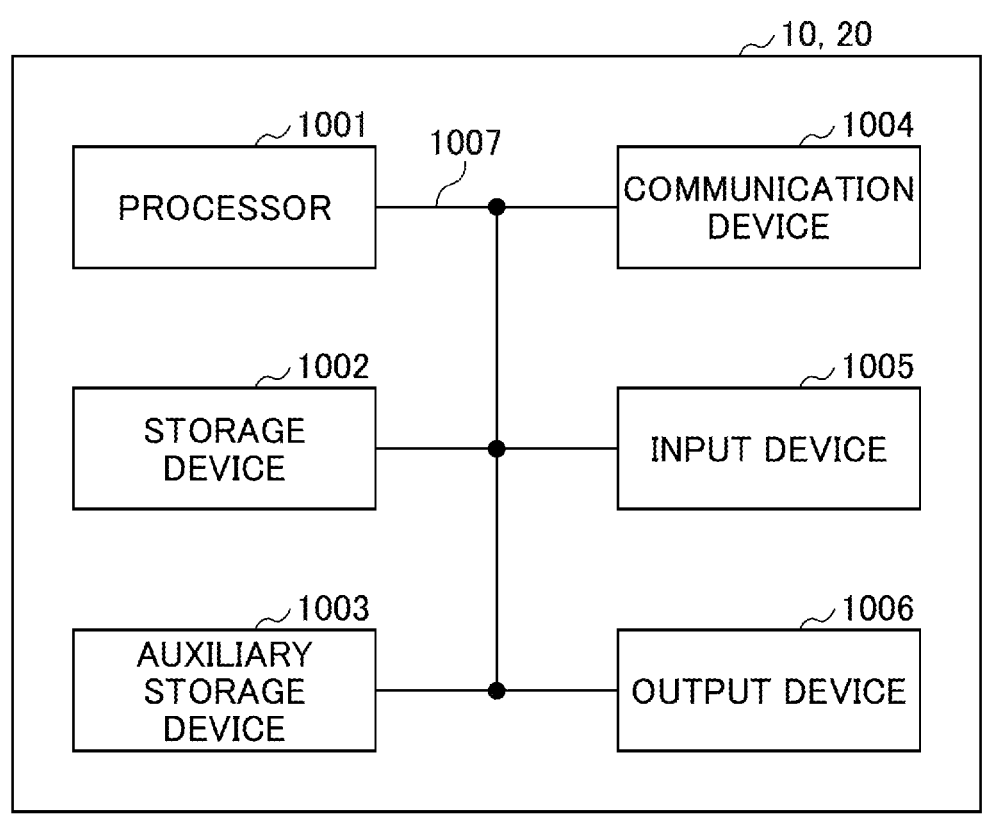
FIG. 13 is a diagram for illustrating one exemplary hardware arrangement of the base station apparatus 10 or the user equipment 20 according to an embodiment of the present invention.

For example, each of the base station apparatus 10, the user equipment 20 and so on according to one embodiment of the present invention may function as a computer performing operations for a radio communication method according to this embodiment. FIG. 13 is a diagram illustrating an example of a hardware configuration of the base station apparatus 10 and the user equipment 20 according to one embodiment of the present disclosure. The base station 10 and the user equipment 20 as stated above may be physically configured as a computer device including a processor 1001, a storage device 1002, a auxiliary storage device 1003, a communication device 1004, an input device 1005, an output device 1006, a bus 1007, etc.

In the following description, the term "device" can be read as a circuit, a device, a unit, etc. The hardware configuration of the base station apparatus 10 and the user equipment 20 may be configured to include one or more of the respective devices shown in the figure, or may be configured without some devices.

Each function of the base station apparatus 10 and the user equipment 20 is implemented by loading predetermined software (program) on hardware, such as the processor 1001 and the storage device 1002, so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, the above-stated control units 140 and 240 or the like may be implemented with the processor 1001.

Additionally the processor 1001 reads a program (program code), a software module, data, etc., from at least one of the auxiliary storage device 1003 and the communication device 1004 to the storage device 1002, and executes various processes according to these. As the program, a program is used which causes a computer to execute at least a cart of the operations described in the above-described embodiment. For example, the control unit 140 of the base station apparatus 10 shown in FIG. 11 may be implemented by a control program that is stored in the storage device 1002 and that is operated by the processor 1001. Also, for example, the control unit 240 of the user equipment 20 shown in FIG. 12 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via telecommunications line.

The storage device 1002 is a computer readable storage medium, and, for example, the storage device 1002 may be formed of at least one a ROM (Read Only Memory), an EPROM (Erasable Programmable ROM), an EEPROM (Electrically Erasable Programmable ROM), a RAM (Random Access Memory) etc. The storage device 1002 may be referred to as a register, a cache, a main memory (main storage device), etc. The storage device 1002 may store a program (program code), a software module, etc. which can be executed for implementing the radio communication method according to one embodiment of the present disclosure.

The auxiliary storage device 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, flash memory (e.g., a card, a stick, a key drive), a floppy (registered trademark) disk, a magnetic strip, etc. The auxiliary storage device 1003 may be referred to as an auxiliary storage device. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, etc. The communication device 1004 may be configured to include, for example, a high frequency switch, a duplexer, a filter, a frequency synthesizer, etc., to implement at least one of frequency division duplex (FDD: Frequency Division Duplex) and time division duplex (TDD: Time Division Duplex). For example, a transceiver antenna, an amplification unit, a transceiver unit, a channel interface or the like may be implemented with the communication device 1004. The transceiver unit may have an implementation with the transmission unit and the reception unit that are physically or logically separated.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output toward outside. The input device 1005 and the output device 1006 may be configured to be integrated (e.g., a touch panel).

Each device, such as processor 1001 and storage device 1002, is also connected by the bus 1007 for communicating information. The bus 1007 may be formed of a single bus or may be formed of different buses between devices.

Also, the base station apparatus 10 and the user equipment 20 may include hardware, such as a microprocessor, a digital signal processor (DSP: Digital Signal Processor), an ASIC (Application Specific Integrated Circuit), a PLD (Programmable Logic Device), and a FPGA (Field Programmable Gate Array), which may implement some or all of each functional block. For example, the processor 1001 may be implemented using at least one of these hardware components.

Conclusion of the Embodiments

As stated above, according to an embodiment of the present invention, there is provided a user equipment, comprising: a reception unit that receives information associated with a transmission configuration state for a downlink shared channel from a base station apparatus; a control unit that individually applies, based on the information associated with the transmission configuration state, configurations associated with a QCL (Quasi Co-Location) to respective downlink shared channels transmitted from a first TRP (Transmission Reception Point) or panel or a second TRP or panel; and a communication unit that performs communication via the downlink shared channels to which the configurations associated with the QCL are applied individually, wherein the information associated with the transmission configuration state includes an RRC (Radio Resource Control) signaling, a MAC, (Media Access Control) signaling and DCI (Downlink Control Information), the RRC signaling includes multiple transmission configuration states, the MAC signaling activates a first number of transmission configuration states applied to the second TRP or panel from among the multiple transmission configuration states, and the DCI has a field that indicates, from among the first number of activated transmission configuration states, a transmission configuration state for a downlink shared channel to be transmitted from the second TRP or panel.

According to the above arrangement, the user equipment 20 can indicate TCI states for PDSCHs transmitted from multiple TRPs or panels of the base station apparatus 10 individually and perform communication to which a proper QCL assumption is applied. In other words, communication using the multiple TRPs (Transmission Reception Points) or panels can be configured in a radio communication system.

The MAC signaling may activate a second number of transmission configuration states applied to the first TRP or panel from among the multiple transmission configuration states, and the DCI may have a field that indicates, from among the second number of activated transmission configuration states, a transmission configuration state for a downlink shared channel to be transmitted from the first TRP or panel. According to the arrangement, the user equipment 20 can indicate the TCI states for respective PDSCHs transmitted from multiple TRPs or panels of the base station apparatus 10 individually.

The DCI may have a field that indicates, from among the second number of activated transmission configuration states, a transmission configuration state for a downlink shared channel to be transmitted from the first TRP or panel, and the DCI may have a field that indicates, from among the first number of activated transmission configuration states, a transmission configuration state for a downlink shared channel to be transmitted from the second TRP or panel. According to the arrangement, user equipment 20 can indicate the TCI states for respective PDSCHs transmitted from multiple TRPs or panels of the base station apparatus 10 individually.

Also, according to an embodiment of the present invention, there is provided a base station apparatus, comprising: a transmission unit that transmits information associated with a transmission configuration state for a downlink shared channel to a user equipment; a control unit that individually applies, based on the information associated with transmission configuration state, configurations associated with a QCL (Quasi Co-Location) to respective downlink shared channels transmitted from a first TRP (Transmission Reception Point) or panel or a second TRP or panel; and a communication unit that performs communication via a downlink shared channel to which the configurations associated with the QCL are individually configured, wherein the information associated with the transmission configuration state includes an RRC (Radio Resource Control) signaling, a MAC (Media Access Control) signaling and DCT (Downlink Control Information), the RRC signaling includes multiple transmission configuration states, the MAC signaling activates a first number of transmission configuration states applied to the second TRP or panel from among the multiple transmission configuration states, and the DCI has a field that indicates, from among the first number of activated transmission configuration states, a transmission configuration state for a down ink shared channel to be transmitted from the second TRP or panel.

According to the above arrangement, the user equipment 20 can indicate TCI states for PDSCHs transmitted from multiple TRPs or panels of the base station apparatus 10 individually and perform communication to which a proper QCL assumption is applied. In other words, communication using the multiple TRPs (Transmission Reception Points) or panels can be configured in a radio communication system.

Also, according to an embodiment of the present invention, there is provided a communication method, comprising: a reception procedure that receives information associated with a transmission configuration state for a downlink shared channel from a base station apparatus; a control procedure that individually applies, based on the information associated with a transmission configuration state, configurations associated with a QCL (Quasi Co-Location) to respective downlink shared channels transmitted from a first TRP (Transmission Reception Point) or panel or a second TRP or panel; and a communication procedure that performs communication via the downlink shared channels to which the configurations associated with the QCL are applied individually, wherein the information associated with the transmission configuration state includes an RRC (Radio Resource Control) signaling, a MAC (Media Access Control) signaling and DCI (Downlink Control Information), the RRC signaling includes multiple transmission configuration states, the MAC signaling activates a first number of transmission configuration states applied to the second TRP or panel from among the multiple transmission configuration states, and the DCI has a field that indicates, from among the first number of activated transmission configuration states, a transmission configuration state for a downlink shared channel to be transmitted from the second TRP or panel.

According to the above arrangement, the user equipment 20 can indicate TCI states for PDSCHs transmitted from multiple TRPs or panels of the base station apparatus 10 individually and perform communication to which a proper QCL assumption is applied. In other words, communication using the multiple TRPs (Transmission Reception Points) or panels can be configured in a radio communication system.

Supplemental Embodiments

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (a MIB (Master Information Block) and a SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), MR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also, a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless contradiction arises. For example, in the methods described in the present disclosure, elements of various steps are illustrated by using an example of order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. However, the other network node may be a combination of a plurality of other network nodes (for example, an MME and a S-GW).

Information, signals, or the like described in the present disclosure may be output from an upper layer (or a lower layer) to a lower layer (or an upper layer). Information, signals, or the like described in the present disclosure may be input and output via a plurality of network nodes.

Information or the like that has been input or output may be stored at a predetermined location (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use or a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, software module, an application, a software application, a software package, a routine, a subroutine, an object, an executable file, an execution thread, a procedure, a function, and the like.

Also, software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Also, information, parameters, and the like described in the present disclosure may be expressed by absolute values, may be expressed by relative values with respect to predetermined values, and may be expressed by corresponding different information. For example, radio resources may be indicated by indices.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells. In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication device, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Things) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments (that may be called D2D (Device-to-Device), V2X (Vehicle-to-Everything), or the like). In this case, a user equipment 20 may have above-described functions of the base station apparatus 10. In this regard, a word such as "up" or "down" may be replaced with a word corresponding to communication between terminals (for example, "side"). For example, an uplink channel, a downlink channel, or the like may be replaced with a side channel.

Similarly, a user terminal according to the present disclosure may be read as a base station. In this case, a base station may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above-described apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of numerology.

The numerology may be a communication parameter that is applied to at least one of transmission and reception of a signal or a channel. The numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in a frequency domain, a specific windowing processing performed by a transceiver in a time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on the numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH1 mapping type B.

Each of a radio frame, a subframe, a slot, a minislot, and a symbol means a time unit for transmitting a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a III, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, slot, or the like.

Note that a long TTI (for example, a normal TTI, a subframe, and the like) may be read as TTI having a time length exceeding 1 ms, and a short TTI (for example, a shortened TTI) may be read as a TTI having a TTI length less than the TTI length of the long TTI and equal to or more than 1 ms.

A resource block (RB) is a resource assignment unit in terms of a time domain and a frequency domain and may include one or a plurality of consecutive subcarriers in terms of frequency domain. The number of subcarriers included in an RB may be the same regardless of the numerology, and, for example, may be 12. The number of subcarriers included in a RB may be determined based on the numerology.

Also, in terms of the time domain, an RB may include one or a plurality of symbols, and may have a length or 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

Also, a resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for certain numerology, in any given carrier. A common RE may be identified by a RE index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of configured EWPs may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of REs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following the article is of a plural form.

Throughout the present disclosure, an expression that "A and B are different" may mean that "A and B are different from each other". Also, this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, the transmission unit 210 and the reception unit 220 are one example of the communication unit. The transmission unit 110 and the reception unit 120 are one example of the communication unit. The TCI state is one example of the transmission configuration state. The PDSCH is one example of the downlink shared channel.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

LIST OF REFERENCE SYMBOLS

10 Base station apparatus
110 Transmission unit
120 Reception unit
130 Configuration unit
140 Control unit
20 User equipment
210 Transmission unit
220 Reception unit
230 Configuration unit
240 Control unit
1001 Processor
1002 Storage device
1003 Auxiliary storage device
1004 Communication device
1005 input device
1006 Output device

The invention claimed is:

1. A terminal comprising:
a receiver that receives a Media Access Control (MAC) subheader and a MAC Control Element (CE), the MAC subheader being attached to the MAC CE, in a downlink shared channel from a base station; and
a processor that performs an activation, based on:
information indicating performing the activation of transmission configuration state in which up to two transmission configuration states can be associated with a same code point, the information being included in the MAC subheader, and
a value set in a field indicating whether an identifier of a second transmission configuration state associated with the same code point is present, the field being included in the MAC CE,
wherein the receiver receives downlink control information including the code point from the base station, and the processor performs quasi co-location (QCL) assumption in a downlink shared channel, based on the two transmission configuration states associated with the code point included in the downlink control information, and
wherein, when the value set in the field indicating whether the identifier of the second transmission configuration state associated with the same code point is present, the field being included in the MAC CE, is 1, the field indicates that the identifier of the second transmission configuration state associated with the same codepoint is present, and when the value set in the field indicating whether the identifier of the second transmission configuration state associated with the same code point is present, the field being included in the MAC CE, is 0, the field indicates that the identifier of the second transmission configuration state associated with the same codepoint is not present.

2. The terminal as claimed in claim 1, wherein a maximum value of a number of code points transmitted by the downlink control information is equal to or greater than 8.

3. The terminal as claimed in claim 1, wherein the processor identifies, by a Logical Channel ID (LCID) included in the MAC subheader, the MAC CE including the field indicating whether the identifier of the second transmission configuration state associated with the same codepoint is present.

4. A base station comprising:
a transmitter that transmits a Media Access Control (MAC) subheader and a MAC Control Element (CE), the MAC subheader being attached to the MAC CE, in a downlink shared channel to a terminal; and
a processor that performs an activation, based on:
information indicating performing the activation of transmission configuration state in which up to two transmission configuration states can be associated with a same code point, the information being included in the MAC subheader, and
a value set in a field indicating whether an identifier of a second transmission configuration state associated with the same code point is present, the field being included in the MAC CE,
wherein the transmitter transmits downlink control information including the code point to the terminal, and
wherein, when the value set in the field is 1, the field indicating whether the identifier of the second transmission configuration state associated with the same code point is present, the field being included in the MAC CE, indicates that the identifier of the second transmission configuration state associated with the same codepoint is present, and when the value set in the field indicating whether the identifier of the second transmission configuration state associated with the same code point is present, the field being included in the MAC CE, is 0, the field indicates that the identifier of the second transmission configuration state associated with the same codepoint is not present.

5. A communication system comprising: a base station; and a terminal, wherein
the base station includes:
a transmitter that transmits a Media Access Control (MAC) subheader and a MAC Control Element (CE), the MAC subheader being attached to the MAC CE, in a downlink shared channel to the terminal, and
the terminal includes:
a receiver that receives the MAC subheader and the MAC CE in the downlink shared channel from the base station; and
a processor of the terminal that performs an activation, based on:
information indicating performing the activation of transmission configuration state in which up to two transmission configuration states can be associated with a same code point, the information being included in the MAC subheader, and
a value set in a field indicating whether an identifier of a second transmission configuration state associated with the same code point is present, the field being included in the MAC CE,
wherein the receiver receives downlink control information including the code point from the base station, and the processor of the terminal performs quasi co-location (QCL) assumption in a downlink shared channel, based on the two transmission configuration states associated with the code point included in the downlink control information, and
wherein, when the value set in the field indicating whether the identifier of the second transmission configuration state associated with the same code point is present, the field being included in the MAC CE, is 1, the field indicates that the identifier of the second transmission configuration state associated with the same codepoint is present, and when the value set in the field indicating whether the identifier of the second transmission configuration state associated with the same code point is present, the field being included in the MAC CE, is 0, the field indicates that the identifier of the second transmission configuration state associated with the same codepoint is not present.

6. A communication method of a terminal, the communication method comprising:
receiving a Media Access Control (MAC) subheader and a MAC Control Element (CE), the MAC subheader being attached to the MAC CE, in a downlink shared channel from a base station; and
performing an activation, based on:
information indicating performing the activation of transmission configuration state in which up to two transmission configuration states can be associated with a same code point, the information being included in the MAC subheader, and
a value set in a field indicating whether an identifier of a second transmission configuration state associated with the same code point is present, the field being included in the MAC CE,
wherein the receiving includes receiving downlink control information including the code point from the base station, and the performing includes performing quasi co-location (QCL) assumption in a downlink shared channel, based on the two transmission configuration states associated with the code point included in the downlink control information, and
wherein, when the value set in the field is 1, the field indicating whether the identifier of the second transmission configuration state associated with the same code point is present, the field being included in the MAC CE, indicates that the identifier of the second transmission configuration state associated with the same codepoint is present, and when the value set in the field indicating whether the identifier of the second transmission configuration state associated with the same code point is present, the field being included in the MAC CE, is 0, the field indicates that the identifier of the second transmission configuration state associated with the same codepoint is not present.

* * * * *